(12) United States Patent
Pacchione et al.

(10) Patent No.: US 8,770,464 B2
(45) Date of Patent: Jul. 8, 2014

(54) METHOD FOR PRODUCING OVERLAPPING WELD JOINTS AND OVERLAPPING WELD JOINT

(75) Inventors: Marco Pacchione, Hamburg (DE); Juergen Silvanus, Munich (DE)

(73) Assignee: Airbus Operations GmbH, Hamburg (DE)

( * ) Notice: Subject to any disclaimer, the term of this patent is extended or adjusted under 35 U.S.C. 154(b) by 5 days.

(21) Appl. No.: 13/101,230

(22) Filed: May 5, 2011

(65) Prior Publication Data
US 2011/0268494 A1 Nov. 3, 2011

Related U.S. Application Data

(63) Continuation of application No. PCT/EP2009/065505, filed on Nov. 19, 2009.

(60) Provisional application No. 61/118,255, filed on Nov. 26, 2008.

(30) Foreign Application Priority Data

Nov. 26, 2008 (DE) .......................... 10 2008 044 087

(51) Int. Cl.
*B23K 20/12* (2006.01)
*B23K 33/00* (2006.01)
*B29C 65/06* (2006.01)

(52) U.S. Cl.
USPC ......... 228/112.1; 228/153; 228/251; 228/252

(58) Field of Classification Search
CPC . B23K 20/12; B23K 20/1225; B23K 20/1265
USPC ......... 403/270, 271; 228/2.1, 112.1, 5.7, 153, 228/251–252; 156/250, 252, 253, 267, 156/304.1, 304.6
See application file for complete search history.

(56) References Cited

U.S. PATENT DOCUMENTS 6,050,474 A * 4/2000 Aota et al. ................. 228/112.1
6,676,008 B1 1/2004 Trapp
(Continued)

FOREIGN PATENT DOCUMENTS

DE 698 23 746 10/2004
DE 103 36 668 A1 2/2005
(Continued)

OTHER PUBLICATIONS

International Search Report for International Application No. WO 2010/060860 A3 dated Jul. 12, 2010.
(Continued)

*Primary Examiner* — Devang R Patel
(74) *Attorney, Agent, or Firm* — Jenkins, Wilson, Taylor & Hunt, P.A.

(57) ABSTRACT

A method for manufacturing welded lap joints comprising the following steps: Providing of two components each having at least one base; allocating the components in such a way that the bases face each other and the components overlap in an overlapping area, which extends at least partially over both components; joining the components by welding in the overlapping area such that a weld joint is formed, wherein at the edge of the overlapping area non welded areas are formed; removing of the non welded areas whereby outer cutting areas are formed at the components, which are arranged at obtuse angles to the overlapping area.

6 Claims, 2 Drawing Sheets

(56) References Cited

U.S. PATENT DOCUMENTS

| | | |
|---|---|---|
| 2005/0139640 A1* | 6/2005 | Kay .......................... 228/112.1 |
| 2006/0169748 A1* | 8/2006 | Ezumi et al. ............... 228/112.1 |
| 2007/0044406 A1 | 3/2007 | van Aken et al. |
| 2007/0280849 A1* | 12/2007 | Fukuchi et al. ............... 420/546 |
| 2007/0284407 A1 | 12/2007 | Jutz et al. |

FOREIGN PATENT DOCUMENTS

| | | |
|---|---|---|
| EP | 0 893 189 | 1/1999 |
| JP | 11 058039 A | 3/1999 |
| JP | 2004 042049 A | 2/2004 |
| SU | 837679 | 6/1981 |
| SU | 941086 | 7/1982 |

OTHER PUBLICATIONS

German Office Action for Application No. 10 2008 044 087.6 dated Nov. 30, 2012.

Russian Decision to Grant for Application No. 2011123696/02 dated May 15, 2013.

* cited by examiner

METHOD FOR PRODUCING OVERLAPPING WELD JOINTS AND OVERLAPPING WELD JOINT

CROSS-REFERENCE TO RELATED APPLICATIONS

This application is a continuation of and claims priority to PCT International Application No. PCT/EP2009/065505 filed Nov. 19, 2009, which claims the benefit of and priority to U.S. Provisional Application No. 61/118,255, filed Nov. 26, 2008 and German Patent Application No. 10 2008 044 087.6, filed Nov. 26, 2008, the entire disclosures of which are herein incorporated by reference.

FIELD OF THE INVENTION

The present invention relates to a method for the production of overlapping weld joints and to an overlapping weld joint of this type.

The term "welding" (according to DIN standard DIN EN 14610 and DIN 1910-100) is understood as meaning the unreleasable joining of components using heat or pressure, with or without additional welding materials. Depending on the welding method, the join is made in a welding seam or in a welding spot, and also in a surface in the case of friction welding. The energy required for welding is supplied externally.

During the production of lap weld joints, the components to be joined together by a weld are brought into an overlapping position such that they can then be welded together.

Lap joints can be welded along the edges by fillet welds and can also be welded together through the layers of material by various methods, for example by spot welding or friction-stir welding.

If lap joints are joined together by spot welding, friction-stir welding or other welding methods which do not provide fillet joints along the edges, the problem arises that joining gaps are produced outside the welded areas between the components which are joined together. These gaps are susceptible to corrosion because, among other reasons, moisture can become trapped here. Moisture penetrates a long way into these gaps by capillary action and remains there. It is difficult to completely fill the narrow gaps with an anti-corrosive coating. For this reason, the durability of this type of overlapping weld joint is not optimum.

There are various approaches in the art, the objective of which is to provide solutions to the mentioned problem. Inter alia, additional fillers are introduced in the overlap region between the components to be joined together in order to overcome the mentioned disadvantages. Thus, in patent application US 2007/0044406 A1, thermoplastic sealants are provided between the components to be joined together by a welded joint, for example. However, these fillers react to some extent with the material in the weld zone at the high processing temperatures and alter the material characteristics during the welding process.

SUMMARY OF THE INVENTION

Therefore, the object of the present invention is to provide a method for the production of overlapping weld joints and an overlapping weld joint which overcomes the mentioned disadvantages. The method according to the invention for the production of overlapping weld joints is to make it possible to produce overlapping weld joints with a high strength and a low susceptibility to corrosion. A further object of the present invention is to be able to produce overlapping weld joints which do not have any gaps outside the actual weld in which moisture or other media can be trapped.

This object is achieved according to the invention by the method for the production of overlapping weld joints which has the features of the independent claim 1 or independent claim 12 and by the overlapping weld joint which has the features of claim 6. Advantageous embodiments and improvements of the invention are provided in the subclaims.

In terms of the method, the idea on which the present invention is based is that in a method for the production of overlapping weld joints, two planar components to be joined together which each have at least one base are initially provided. With regard to the components, the method is preferably to be used for sheet metal parts. The sheet metal parts consist particularly preferably of steel, preferably titanium, aluminium or other weldable materials, for example thermoplasts.

In a subsequent step of the method, the components are arranged such that the bases face one another and the components overlap one another in an overlap region which at least partly extends over both bases. The bases can be imagined as substantially planar plateau-shaped elevations, emanating from the planar base material. If the two components are arranged one on top of the other with the bases facing one another, the remaining planar regions of the components are thus generally at a distance from one another. The bases preferably merge with a radius into the planar base material.

In a subsequent step of the method, the components are joined together by welding in the overlap region with the formation of at least one weld, with non-welded regions being formed along the weld at the edge of the overlap region. Thus, welding is carried out in the region in which the bases adjoin one another. Extending next to the weld, but still in the region in which the bases overlap along the weld are non-welded regions, in the region of which the bases rest against one another or form a gap.

Thereafter, the non-welded regions of the overlapping component material are removed in the overlap region, thereby forming outer cut surfaces on the components which are arranged at an obtuse angle to the overlap region. As described above, when the components are welded in the overlap region of the bases, non-welded regions in which the components rest against one another or form a gap remain next to the weld. In order to remove these regions, which are susceptible to corrosion since moisture can also collect here by capillary action, the non-welded material next to the weld is removed. In this respect, the bases advantageously allow the material to be removed, without the base material outside the bases being damaged during said removal.

According to a preferred development of the present invention, at least two substantially parallel welds are formed when the two components are welded. The provision of a plurality of welds running next to one another can provide an increased strength when the two components are joined. The individual welds are preferably arranged next to one another without a gap. In so doing, the individual welds more preferably overlap one another. This prevents moisture from penetrating between the individual adjacent welds and being able to cause corrosion there.

More preferably, in the method according to the invention for the production of overlapping weld joints, friction-stir welding is used as the welding method, in which a rotating welding tool is pressed against at least one of the components to generate friction heat. In the first step of this welding method, a rotating tool is preferably pressed with sufficiently high force into the joint gap between the two components until a shoulder of the tool rests against the upper surface of the component. During the second step, the rotating tool remains for a few seconds at the immersion point. Due to the friction between the tool shoulder and the joint partners, the tool heats up under the shoulder to just below melting point. The result of this rise in temperature is a reduction in solidity, and consequently the material is plasticised and a blending of the joint zone is possible. The commencement of the forwards movement indicates the start of the third step in which the rotating tool is moved along the joint line with a high contact pressure force. The pressure gradient, resulting from the forwards movement, between the front and back of the tool and the rotational movement thereof induce the transport of plasticised material around the tool, where the material is mixed and forms the weld. At the end of the weld, the tool is removed from the joint zone. The advantages of friction-stir welding are that no additional tools are required, high weld strengths can be achieved, an inert gas is not required, the process sequence is relatively simple, a broad spectrum of mix connections can be realised and welding can be carried out at relatively low process temperatures, thereby producing a low distortion and the structural characteristics of the components to be welded are only slightly affected.

According to a preferred embodiment of the present invention, during the welding procedure an auxiliary tool is arranged such that one of the components is clamped between the auxiliary tool and the welding tool and both bases rest against the auxiliary tool. During friction-stir welding, material from both bases is then pressed into a recess in the auxiliary tool, which recess is adjacent to both bases. The pressed-in material closes the parting line between the two components outside the actual weld. This measure seals the components which are joined together. A gap next to the weld in which moisture causing corrosion can be trapped is thus advantageously closed.

According to a preferred embodiment, the auxiliary tool is at least partly provided with a scratch-proof, anti-adhesive coating. More preferably, a Teflon coating or preferably a ceramic coating is provided for this purpose. This has the advantage that the heated welded material does not adhere to the auxiliary tool or damage it.

An overlapping weld joint according to the invention has at least two components which overlap in an overlap region and each have at least one base, the bases being oriented towards one another and extending at least partly into the overlap region and at least one weld is provided in the overlap region which joins the two components together and outer lateral cut surfaces, formed by the removal of weld structure material, are produced on both sides of the weld which are arranged along the weld at an obtuse angle to the overlap region of the two components.

The method according to the invention for the production of overlapping weld joints and the overlapping weld joint according to the invention afford the advantage of a gap-free connection of the welded joint. The durability of the welded joint according to the invention is higher than that of known overlapping weld joints. No additional fillers are required between the components to be joined. The corrosion resistance of the welded joint according to the invention is higher than that of known welded joints, particularly since gaps are not formed in the lap weld next to the welded seam which are difficult to seal and present a point of attack for corrosion.

In the following, the invention will be described in more detail on the basis of embodiments with reference to the accompanying figures of the drawings.

DESCRIPTION OF EXEMPLARY EMBODIMENTS

Figure 1:
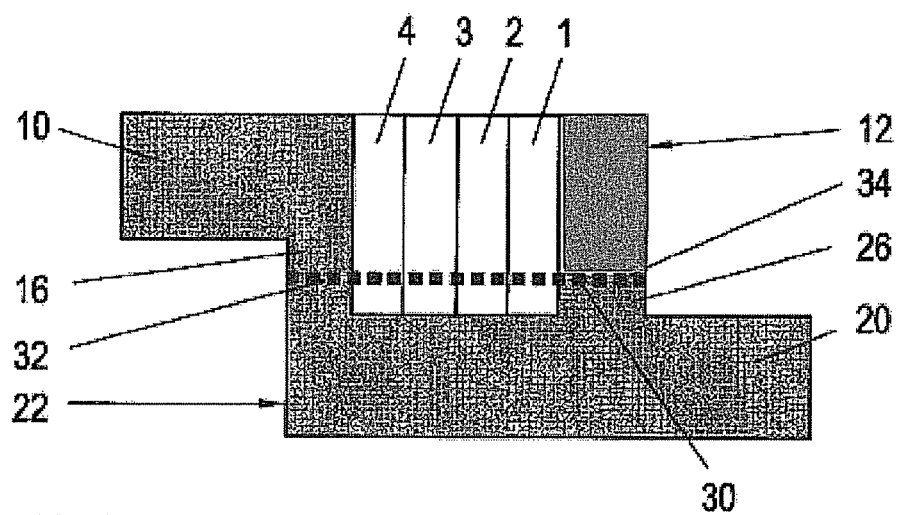
FIG. 1 is a schematic sectional view of an overlapping weld joint of the invention according to a first embodiment in a first production stage.

In the figures, the same reference numerals denote the same or functionally identical components, unless indicated otherwise.

FIG. 1 is a schematic sectional view of an overlapping weld joint of the invention according to a first embodiment in a first production stage. The sectional view has been chosen such that friction-stir welds 1, 2, 3, 4 extend into the plane of the paper along a first component 10 and a second component 20 to be joined thereto. The first component 10 has a base-shaped elevation 16 which is shown here on the lower side of the component 10. The second component 20 also has a base-shaped elevation 26 which is shown here on the upper side of the second component 20. The components 10, 20 overlap with the bases 16, 26 in an overlap region 30 which is shown here as a dotted line. In this view, four friction-stir welds 1, 2, 3, 4 are made next to one another in the second component 20 downwards from above through the first component 10. The friction-stir welds 1, 2, 3, 4 adjoin one another, overlapping each other at the sides and, in this view, extend substantially vertically to the plane of the paper. Provided in the overlap region 30 of the two components 10, 20 on both sides of the welds 1, 2, 3, 4 is a respective weld-free region 32, 34 where the two components 10, 20 have not been welded together.

Figure 2:
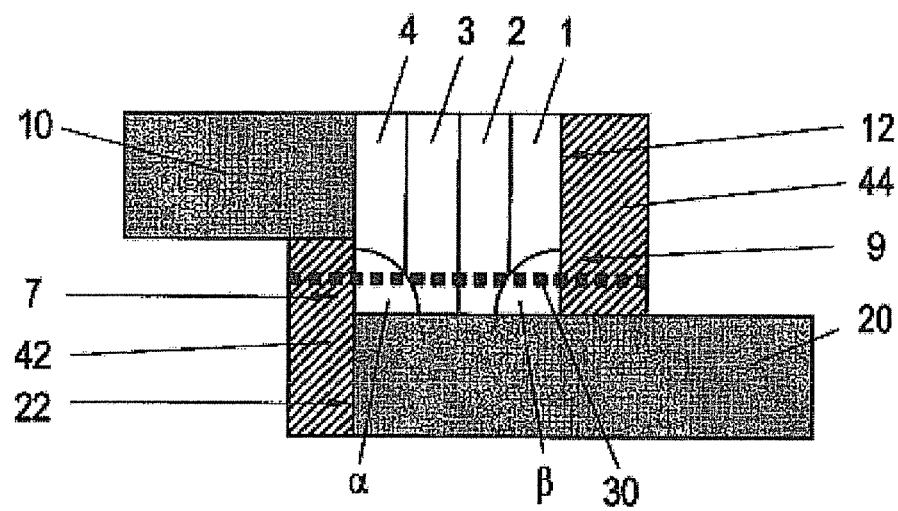
FIG. 2 is a schematic sectional view of an overlapping weld joint of the invention according to the embodiment of FIG. 1 in a finished state.

FIG. 2 is a schematic sectional view of an overlapping weld joint of the invention according to the embodiment of FIG. 1 in a finished state. The components 10, 20 are welded together by four overlapping welds 1, 2, 3, 4. The non-welded regions 32 and 34 of FIG. 1 are no longer provided because they have been separated or removed. For this purpose, a first cut region 42 and a second cut region 44 are shown schematically as rectangles. In these cut regions 42, 44, material has been separated from the two components 10, 20 such that there are no longer any non-welded regions 32, 34 in the overlap region 30 of the two components 10, 20, but the two components 10, 20 are positioned one on top of the other only in the region of the welds 1, 2, 3, 4. Removing material from the two components 10, 20 has formed a first outer cut surface 7 and a second outer cut surface 9 which are each arranged at an obtuse angle α and β to the overlap region 30 and run along an end face 12 on the first component 10 or an end face 22 on the second component 20 along the respectively opposite base 16 or 26 of the other component 10 or 20.

The welded joint is free from gaps as a result of removing the non-welded overlap regions. Thus, it is no longer possible for moisture to be trapped in the overlap region of the two components, resulting in corrosion. Consequently, the durability of the welded joint can be substantially increased.

Figure 3:
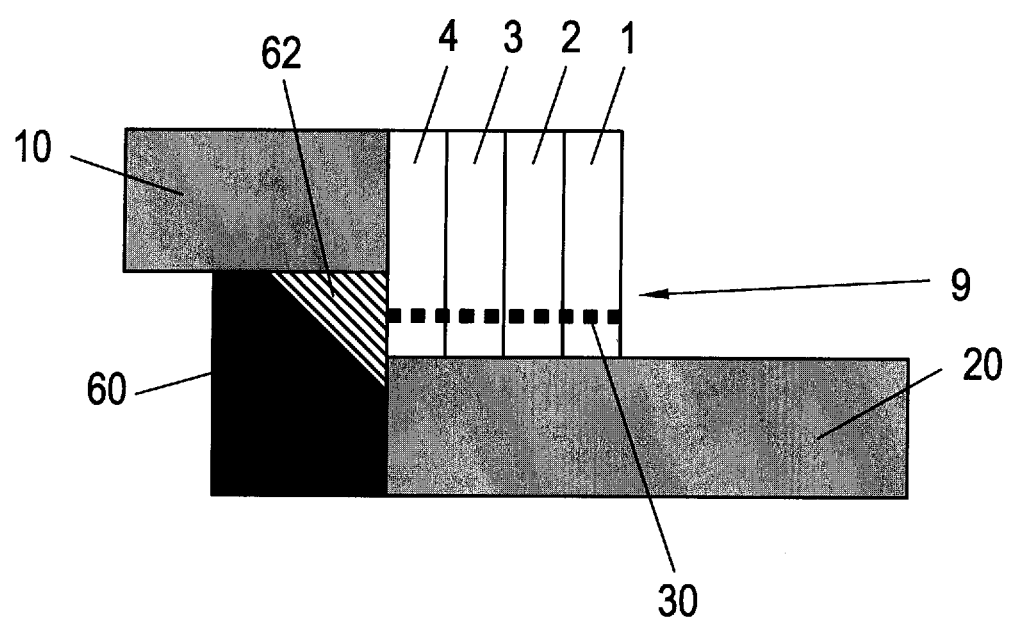
FIG. 3 is a schematic sectional view of an overlapping weld joint of the invention according to a second embodiment.

FIG. 3 is a schematic sectional view of an overlapping weld joint of the invention according to a second embodiment. Two overlapping components 10, 20 which are constructed analogously to the components in FIGS. 1 and 2 are welded together by four stir friction welds 1, 2, 3, 4. In the right-hand region of the illustration, the overlap region 30 has been removed up to the weld 1 by a subsequent machining operation corresponding to the embodiment of FIG. 2 in order to produce a gap-free join. The left-hand region of the illustration shows an auxiliary tool 60 which has a recess 62 on the upper right-hand side. The auxiliary tool is arranged such that the component 10 is clamped between the auxiliary tool 60 and the welding tool 50 and both components 10, 20 rest against the auxiliary tool 60. Material from both components 10, 20 is pressed into a recess 62 in the auxiliary tool 60 which adjoins both components 16, 26.

As a result, a gap-free welded joint 1 is produced according to this embodiment as well. During welding, the component material is pressed into the recess 62 such that it is moulded closely with the first and second components 10, 20 and thus seals the overlap region 30 between the two components 10, 20.

Although the present invention has been described here on the basis of preferred embodiments, it is not restricted thereto but can be modified in many different ways.

List of Reference Numerals

1, 2, 3, 4 welds
7 first outer cut surface
9 second outer cut surface
10 first component
12 end face of the first component
16 base on the first component
20 second component
22 end face of the second component
26 base on the second component
30 overlap region
32 first non-welded region
34 second non-welded region
42 first cut region
44 second cut region
50 welding tool
60 auxiliary tool
62 recess
α angle between first outer cut surface and the overlap region
β angle between second outer cut surface and the overlap region

The invention claimed is:

1. A method for the production of overlapping weld joints comprising the following steps:
   (a) provision of two components which are to be joined and each have a planar base material and at least one plateau-shaped elevation emanating from the planar base material;
   (b) arrangement of the components such that the plateau-shaped elevations are contacting one another and the components overlap to form an overlap region;
   (c) joining of the components by welding in the overlap region while forming at least one weld, wherein in the overlap region of the two components on both sides of the at least one weld a non-welded region is formed, wherein the two components overlap in the non-welded region and are not welded together; and
   (d) separating material from the two components to remove the non-welded regions to form outer cut edges on the components which are arranged at an angle to an edge of the overlap region in which the two components overlap and are welded together.

2. The method according to claim 1, wherein the step of removing the non-welded regions in step (d) of the method is performed by a machining method.

3. The method according to claim 1, wherein during the step of joining the components, at least two substantially parallel welds are formed which adjoin one another or overlap without a gap.

4. The method according to claim 1, wherein the first outer cut edge is formed such that it extends from the plateau-shaped elevation of the first component over at least an end face of the opposite component and the second outer cut edge is formed such that it extends from the plateau-shaped elevation of the second component over an end face of the opposite component.

5. The method according to claim 1, wherein during the step of joining the components, friction-stir welding is used as the welding method in which a rotating welding tool is pressed against at least one of the components to generate friction heat.

6. The method according to claim 2, wherein the step of removing the non-welded regions in step (d) of the method is performed by a milling operation.

\* \* \* \* \*